US012794820B2

(12) United States Patent
Gu et al.

(10) Patent No.: US 12,794,820 B2
(45) Date of Patent: Nov. 10, 2026

(54) METHOD AND APPARATUS FOR CROSS-NETWORK-ELEMENT DETERMINISTIC FORWARDING, NETWORK ELEMENT, AND STORAGE MEDIUM

(71) Applicant: ZTE CORPORATION, Shenzhen (CN)

(72) Inventors: Xiaoyun Gu, Shenzhen (CN); Bo Han, Shenzhen (CN); Xiangwen Du, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 122 days.

(21) Appl. No.: 18/879,894

(22) PCT Filed: May 12, 2023

(86) PCT No.: PCT/CN2023/093996

§ 371 (c)(1),
(2) Date: Dec. 30, 2024

(87) PCT Pub. No.: WO2024/001570

PCT Pub. Date: Jan. 4, 2024

(65) Prior Publication Data

US 2026/0261520 A1 Sep. 3, 2026

(30) Foreign Application Priority Data

Jun. 29, 2022 (CN) ......................... 202210762306.5

(51) Int. Cl.
*H04L 47/283* (2022.01)
*H04L 45/00* (2022.01)
*H04L 45/42* (2022.01)

(52) U.S. Cl.
CPC ............ *H04L 47/283* (2013.01); *H04L 45/38* (2013.01); *H04L 45/42* (2013.01)

(58) Field of Classification Search
CPC ........ H04L 47/283; H04L 45/38; H04L 45/42
See application file for complete search history.

(56) References Cited

U.S. PATENT DOCUMENTS 12,477,486 B2 * 11/2025 Xiong ................... H04J 3/0644
12,495,326 B2 * 12/2025 Rost .................. H04W 28/0268
(Continued)

FOREIGN PATENT DOCUMENTS

CN 101496348 A 7/2009
CN 110611924 A 12/2019
(Continued)

OTHER PUBLICATIONS

Zhu et al., "5g release 16 key technologies for vertical application industries", Jun. 28, 2021, IEEE Publishing.*
(Continued)

*Primary Examiner* — Todd L Barker
(74) *Attorney, Agent, or Firm* — CANTOR COLBURN LLP

(57) ABSTRACT

The embodiments of the present application relate to a method and apparatus for cross-network element deterministic forwarding, a network element and a storage medium. The method comprises: receiving a first forwarding parameters reported by a TSN AF, the first forwarding parameters being used for representing forwarding parameters of an N19 interface corresponding to an NW-TT of two TSN network bridges bearing each TSN session; acquiring a current TSN service flow to be forwarded, and on the basis of the current TSN service flow and first forwarding parameters, selecting a target forwarding path from preset paths; determining an egress port parameter and a counterpart port parameter for forwarding the current TSN service flow on the basis of the first forwarding parameters corresponding to the target forwarding path; and transmitting preset flow label information, the current TSN service flow and the counterpart port parameter to a first NW-TT corresponding to the egress port parameter according to a preset transmission path.

20 Claims, 4 Drawing Sheets

(56) References Cited

U.S. PATENT DOCUMENTS

| | | | | |
|---|---|---|---|---|
| 12,500,836 | B2 * | 12/2025 | Zhu | H04L 45/302 |
| 2022/0053363 | A1 | 2/2022 | Kim et al. | |
| 2022/0060970 | A1 * | 2/2022 | Zhu | H04L 45/302 |
| 2022/0295577 | A1 * | 9/2022 | Yao | H04L 12/4633 |
| 2023/0239175 | A1 * | 7/2023 | Sachs | H04L 12/4625 |
| 2025/0056310 | A1 * | 2/2025 | Zhu | H04W 28/0967 |

FOREIGN PATENT DOCUMENTS

| | | | |
|---|---|---|---|
| CN | 110809295 | A | 2/2020 |
| CN | 113556763 | A | 10/2021 |
| CN | 114071499 | A | 2/2022 |
| CN | 114205866 | A | 3/2022 |
| JP | 2022526387 | A | 5/2022 |
| WO | 2020221266 | A1 | 11/2020 |
| WO | 2020245679 | A1 | 12/2020 |
| WO | 2022020020 | A1 | 1/2022 |

OTHER PUBLICATIONS

Brown et al., "Dynamic End-toEnd Slicingt for 5G Verticals", Aug. 31, 2020, IEEE Publishing.*

Japanese Office Action for corresponding application 2024576723 dated Nov. 19, 2025.

European Search Report for corresponding application EP23829756; Report dated Jul. 3, 2025.

Notice of Granting of Patent for Invention for corresponding application 202210762306.5, dated Aug. 11, 2025.

International Search Report for corresponding application PCT/CN2023/093996 filed May 12, 2023; Mail date Jul. 21, 2023.

Nokia, KI#2 Sol#4 Solution Update: Deterministic QoS for UE-UE TSC Communication, Oct. 12, 2020, S2-2007747.

* cited by examiner

METHOD AND APPARATUS FOR CROSS-NETWORK-ELEMENT DETERMINISTIC FORWARDING, NETWORK ELEMENT, AND STORAGE MEDIUM

CROSS-REFERENCE TO RELATED APPLICATION

This disclosure is a national stage filing under 35 U.S.C. §371 of international application number PCT/CN2023/093996 filed on 12 May 2023, which is based upon and claims the benefit of priority from Chinese Patent Application No. 202210762306.5, filed on Jun. 29, 2022, the entire disclosure of which is incorporated herein by reference.

TECHNICAL FIELD

The embodiments of the present invention relate to the technical field of communications, and in particular, to a method and an apparatus for cross-network element deterministic forwarding, a network element, and a storage medium.

BACKGROUND

As a new generation of mobile communication systems, the large bandwidth, high reliability and low latency of 5G networks have a wide range of application scenarios in the industrial Internet, 5G networks can meet the flexible mobility of industrial Internet devices, aiding in the flexible production of factories; and also have the capability for differentiated network customization, thereby satisfying a variety of service requirements. A Time Sensitive Network (TSN) is a set of data link layer protocol specifications developed by the IEEE802.1 task group, and aims to construct a more reliable, low-delay and low-jitter Ethernet. The TSN can provide a microsecond-level deterministic service, and can ensure real-time requirements of various industries; in the art, depending on the 5G wireless access and a deterministic time delay provided by the TSN, the 5G TSN technology can satisfy various indexes of deterministic communication in wireless network transmission, and is an important basis for realizing industrial Internet wireless and flexible manufacturing.

In conventional TSN networks, the service flow characteristics of end stations, such as burst time, period, identifier, and latency requirements, are registered in a Centralized User Configuration (CUC) system. The CUC issues the end station characteristics to a centralized network configuration (CNC), and according to the forwarding capability and resource reservation condition of each TSN bridge controlled thereby, the CNC issues a service flow identifier-based scheduling information by means of a network configuration protocol (NetConf) interface, so that each service flow passes through the various nodes without conflict, thereby ensuring the determination of a time delay.

In the related art, after a 5G system is introduced, the TSN integrates the 5G system into the TSN system as a network bridge. With reference to FIGS. 1 and 2, the communication between a TSN network and a 5G network is performed by means of a TSN translator function. The TSN translator comprises a device side TSN translator (DS-TT) and a network side TSN translator (NW-TT), and a corresponding packet may enter the TSN network bridge from the DS-TT or NW-TT.

In the related art, in the 5G LAN scenario, when a session management function (SMF) entity selects different user plane functions (UPF) for users in a 5G virtual network group, the SMF generates a group-level N4 session, and forwards the user traffic or service flows between user equipments (UE) within the 5G virtual network group to the specified UPF by means of the N19 tunnel between UPFs, so as to achieve traffic intercommunication among users within the 5G virtual network group, and correspondingly achieve UE-to-UE intercommunication across UPFs. In this application scenario, the SMF controls the forwarding path between the UEs in the 5G virtual network group; however, when the UE-to-UE intercommunication across UPFs is applied to the TSN, as it is necessary for the CNC to centrally control the forwarding path and scheduling parameters of deterministic scheduling, the forwarding path controlled by the SMF for the UEs in the 5G virtual network group in the 5G LAN scenario is not suitable for TSN; furthermore, since the CNC cannot perceive the characteristics and forwarding requirements of the TSN service flows, it cannot issue accurate forwarding paths and scheduling parameters, and thus cannot ensure the deterministic forwarding of the forwarded packets between the UPFs.

For the problem in the related art that the deterministic forwarding of the packet cannot be ensured in the scenario of the UE-to-UE intercommunication across UPFs, there is no effective solution yet.

SUMMARY

The embodiments of the present application provide a method and apparatus for cross-network element deterministic forwarding, a network element, and a storage medium, so as to at least solve the problem in the related art that the deterministic forwarding of the packet cannot be ensured in the scenario of the UE-to-UE intercommunication across UPFs.

An embodiment of the present application provides a method for cross-network element deterministic forwarding, which is applied to a CNC. The method comprises: receiving first forwarding parameters reported by a TSN application function (AF), wherein the first forwarding parameters are used for representing forwarding parameters of an N19 interface corresponding to a network TSN translator (NW-TT) of two TSN bridges bearing each TSN session, and the first forwarding parameters are acquired by the TSN AF from a capability parameter reported by one of the two NW-TTs corresponding to each TSN session; acquiring a current TSN service flow to be forwarded, and selecting a target forwarding path from preset paths on the basis of the current TSN service flow and the first forwarding parameters, wherein the current TSN service flow is a service flow forwarded according to the N19 interface; determining an egress port parameter and a counterpart port parameter for forwarding the current TSN service flow on the basis of the first forwarding parameters corresponding to the target forwarding path, and transmitting preset flow label information, the current TSN service flow and the port parameter to a first NW-TT corresponding to the port parameter according to a preset transmission path, wherein the flow label information is used for representing the unique identifier of the current TSN service flow; and controlling the first NW-TT to generate a forwarded packet in a preset format on the basis of the flow label information, the current TSN service flow and the counterpart port parameter, and performing cross-network element deterministic forwarding on the forwarded packet when the first NW-TT performs intercommunication with the N19 interface of the second NW-TT corresponding to the counterpart port parameter.

An embodiment of the present application provides an apparatus for cross-network element deterministic forwarding, which is applied to a CNC, comprising:

a receiving module, configured to receive first forwarding parameters reported by the TSN AF, wherein the first forwarding parameters are used for representing forwarding parameters of an N19 interface corresponding to a NW-TT of two TSN bridges bearing each TSN session, and the first forwarding parameters are acquired by the TSN AF from a capability parameter reported by one of the two NW-TTs corresponding to each TSN session; a selection module, configured to acquire a current TSN service flow to be forwarded, and select a target forwarding path from preset paths on the basis of the current TSN service flow and the first forwarding parameters, wherein the current TSN service flow is a service flow forwarded according to the N19 interface; and a determination module, configured to determine an egress port parameter and a counterpart port parameter for forwarding the current TSN service flow on the basis of the first forwarding parameters corresponding to the target forwarding path, and transmit preset flow label information, the current TSN service flow and the port parameter to a first NW-TT corresponding to the port parameter according to a preset transmission path, wherein the flow label information is used for representing the unique identifier of the current TSN service flow.

An embodiment of the present application provides a centralized network configuration network element, comprising a processor, a communication interface, a memory and a communication bus, wherein the processor, the communication interface and the memory complete communication with each other by means of the communication bus; a memory configured to store a computer program; and a processor configured to execute the steps of the method for realizing cross-network element deterministic forwarding according to any embodiment of the first aspect when executing the program stored in the memory.

An embodiment of the present application provides a computer readable storage medium on which a computer program is stored, wherein the computer program implements the steps of the method for cross-network element deterministic forwarding according to any embodiment of the first aspect when being executed by a processor.

The details of one or more embodiments of the present application are presented in the accompanying drawings and description below, to make other features, objectives and advantages of the present application more concise and understandable.

BRIEF DESCRIPTION OF THE DRAWINGS

Accompanying drawings herein are incorporated into the specification and constitute into a part of the specification, show examples consistent with the present invention, and are used to explain principles of the present invention with the specification.

To describe the technical solutions in the embodiments of the present invention or in the existing technology more clearly, the following briefly describes the accompanying drawings required for describing the embodiments or the existing technology. Apparently, a person of ordinary skill in the art may still derive other accompanying drawings from these accompanying drawings without creative efforts.

DETAILED DESCRIPTION OF THE EMBODIMENTS

To make the objects, technical solutions, and advantages of the embodiments of the present disclosure clearer, hereinafter, the technical solutions in the embodiments of the present application will be described clearly and thoroughly with reference to the accompanying drawings of the embodiments of the present application. Obviously, the embodiments as described are some of the embodiments of the present application, and are not all of the embodiments of the present application. All other embodiments obtained by those of ordinary skill in the art on the basis of the embodiments in the application without creative work shall fall within the scope of protection of the application.

The technical solutions in the embodiments of the present disclosure will be described below with reference to the accompanying drawings in the embodiments of the present disclosure.

Figure 1:
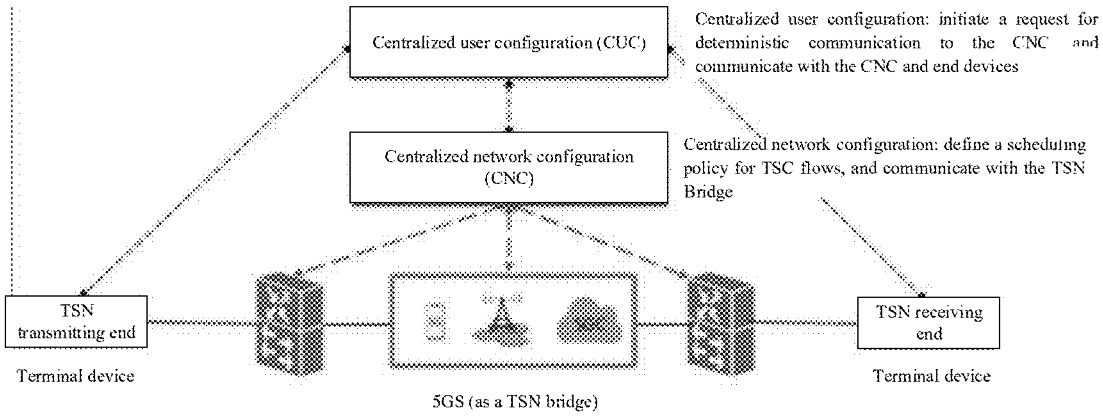
FIG. 1 is a schematic diagram of a TSN network system in the related art.
Figure 2:
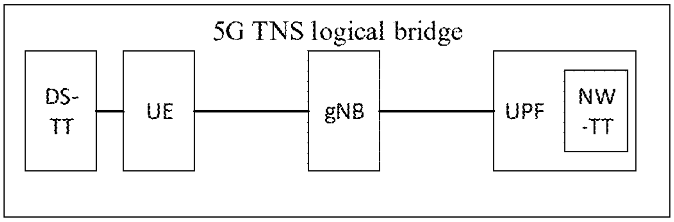
FIG. 2 is a schematic diagram of a TSN bridge in the related art.
Figure 3:
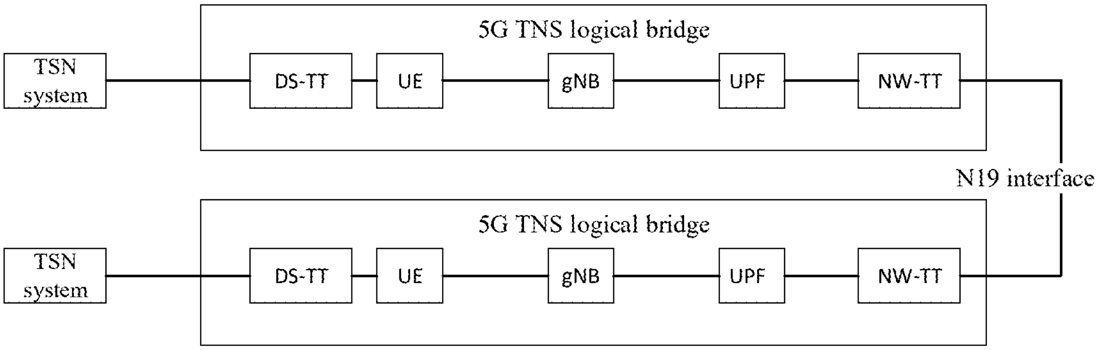
FIG. 3 is a schematic diagram of a connection between TSNs bridges in the related art.
Figure 4:
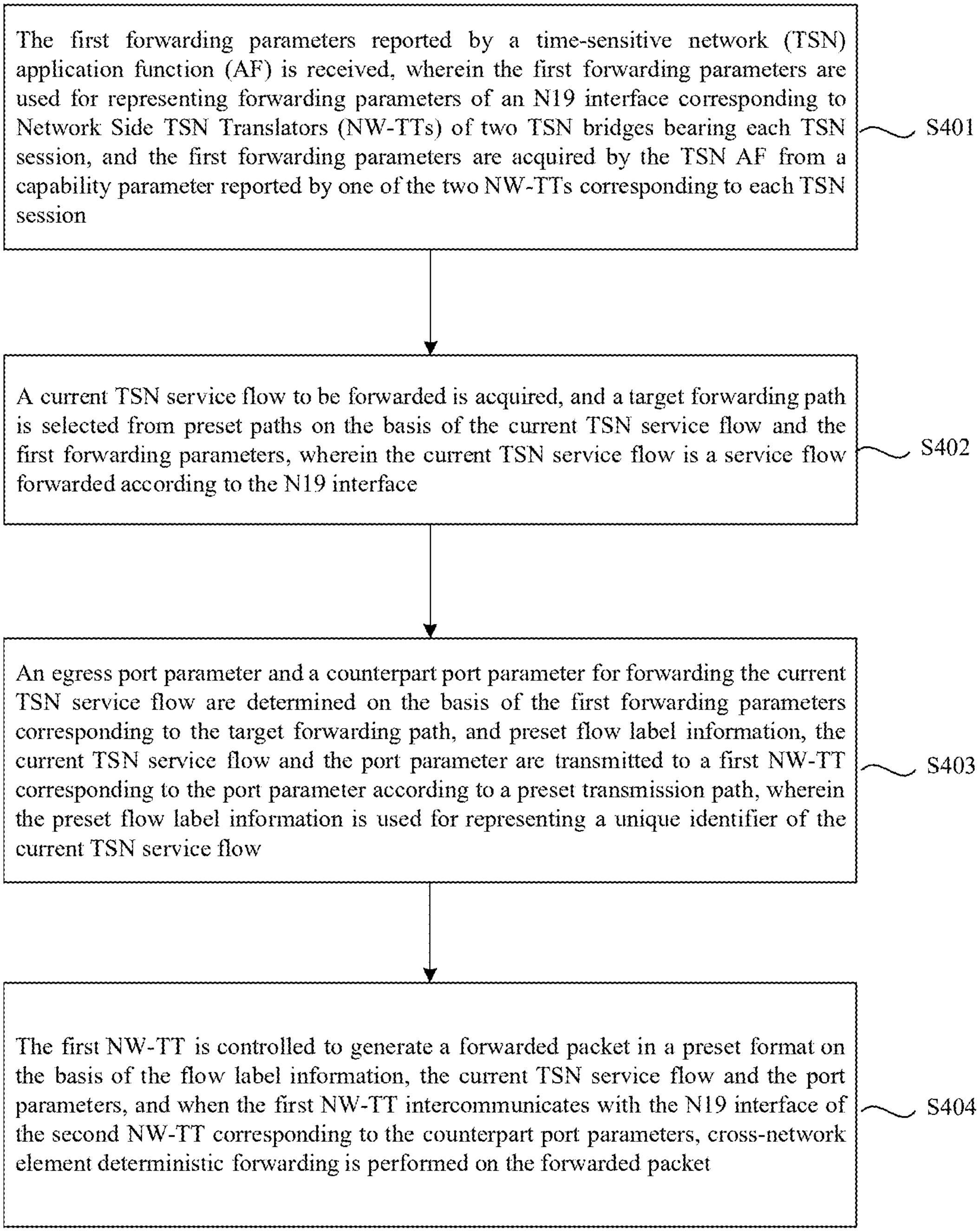
FIG. 4 is a schematic flowchart of a method for cross-NE deterministic forwarding according to an embodiment of the present application.

FIG. 4 is a schematic flowchart of a method for cross-NE deterministic forwarding according to an embodiment of the present application. As shown in FIG. 3, an embodiment of the present application provides a method for cross-network element deterministic forwarding, which is applied to a CNC. The method comprises the following steps:

step S401: first forwarding parameters reported by a time-sensitive network (TSN) application function (AF) is received, wherein the first forwarding parameters are used for representing forwarding parameters of an N19 interface corresponding to Network Side TSN Translators (NW-TTs) of two TSN bridges bearing each TSN session, and the first forwarding parameters are acquired by the TSN AF from a capability parameter reported by one of the two NW-TTs corresponding to each TSN session.

In the present embodiment, the CNC in the TSN network system is used as an execution subject, and in the present embodiment, the so-called deterministic forwarding across network elements refers to the deterministic forwarding of TSN service flows across UPFs, specifically studying the deterministic forwarding between two UPFs by means of the N19 interface (as shown in FIG. 3); in the present embodiment, the object involved in the deterministic forwarding of TSN service flows is the NW-TT of the UPF of two TSN bridges bearing one TSN session; furthermore, in the TNS network system, the target forwarding path and the scheduling parameters (for example, the corresponding port parameters) for deterministic forwarding need to be controlled centrally by the CNC, and therefore the CNC needs to acquire the forwarding parameters corresponding to the N19 interface reported by the corresponding TSN bridge.

In the present embodiment, the first forwarding parameters are a pair of forwarding parameters corresponding to the NW-TT that supports the deterministic forwarding based on the N19 interface.

In the present embodiment, the CNC obtains the forwarding parameters corresponding to the N19 interface reported by the TSN bridge including: the TSN AF acquire the TSN capability of the corresponding NW-TT, determining whether it supports the deterministic forwarding over the N19 interface, subscribing to the forwarding parameters of deterministic forwarding over the N19 interface from the corresponding NW-TT, and receiving the forwarding parameters reported by the NW-TT; since the TSN AF is located at the 5G control plane of the TSN network system and the TSN bridge is located at the 5G user plane of the TSN network system, the TSN AF needs to acquire the TSN capability of the NW-TT according to a transmission path of (TSN AF)-Policy Control Function (PCF)-SMF-UPF-(NW-TT), and obtain the TSN capability supported by the NW-TT by using the instructions defined in the 24519 protocol for managing Ethernet port messages; the NW-TT feeds back the supported TSN capability according to the transmission path of (NW-TT)-UPF-SMF-PCF-(TSN AF), bears the corresponding TSN capability by using Ethernet port management response information defined in the 24519 protocol, and sends the relevant parameter representing the TSN capability to the TSN AF. In the present embodiment, whether the NW-TT supports the deterministic forwarding of the N19 interface is determined by determining whether a corresponding capability value in relevant parameters are a preset parameter value (for example, 8001H). In the present embodiment, upon determination that the NW-TT bearing the corresponding TSN session supports the deterministic forwarding of the N19 interface, the GW subscribes to the forwarding parameters of the N19 interface from the corresponding NW-TT, that is, notifies the NW-TT that the NW-TT is needed in the corresponding TSN session, and upon receipt that bearing an ongoing TSN session requires the use of the NW-TT, after the UPF has allocated to the TSN session the forwarding parameters of the N19 interface, the NW-TT will send the forwarding parameters to the TSN AF. In an optional implementation, the forwarding parameters of the N19 interface allocated by the UPF for the TSN session include a GTU-U tunnel allocated for the TSN session.

Step S402: a current TSN service flow to be forwarded is acquired, and a target forwarding path is selected from preset paths on the basis of the current TSN service flow and the first forwarding parameters, wherein the current TSN service flow is a service flow forwarded according to the N19 interface.

In the present embodiment, after receiving the first forwarding parameters, the CNC performs network configuration by referring to a service flow burst period, a service flow volume, a network time delay, and TSN bearer network reserved resources, so as to define a scheduling policy of the TSC flow. In the present embodiment, after the RNC determines the time delays between the NW-TTs of the two TSN bridges, in combination with the corresponding time delays of the two TSN bridges, a time delay of the TSN service flows passing through each TSN bridge and an end-to-end (the TSN bridge to the TSN bridge) time delay can be determined in the scenario where the UEs communicate with each other by means of the N19 interface. In the present embodiment, the CNC sends the GTP-U tunnel information of the N19 interface corresponding to the first forwarding parameters and the determined target forwarding path to the NW-TT by means of the corresponding transmission path, and the NW-TT performs deterministic TSN flow scheduling.

Step S403: an egress port parameter and a counterpart port parameter for forwarding the current TSN service flow are determined on the basis of the first forwarding parameters corresponding to the target forwarding path, and preset flow label information, the current TSN service flow and the port parameter are transmitted to a first NW-TT corresponding to the port parameter according to a preset transmission path, wherein the preset flow label information is used for representing a unique identifier of the current TSN service flow.

In the present embodiment, the CNC encapsulates and sends the first forwarding parameters corresponding to the target forwarding path, the flow label information and the current TSN service flow to the TSN AF as the TSN configuration information, and then the TSN configuration information is processed by the TSN AF and sent to the NW-TT, so as to determine the egress port and gated time slot of the TSN service flow, the GTP-U tunnel information of the counterpart NW-TT, and the flow label information uniquely identifying the current TSN service flow.

Step S404: the first NW-TT is controlled to generate a forwarded packet in a preset format on the basis of the flow label information, the current TSN service flow and the port parameters, and when the first NW-TT intercommunicates with the N19 interface of the second NW-TT corresponding to the counterpart port parameters, cross-network element deterministic forwarding is performed on the forwarded packet.

In the present embodiment, the CNC sends the egress port and gated time slot of the TSN service flow, the GTP-U tunnel information of the counterpart NW-TT, and the flow label information uniquely identifying the current TSN service flow to the NW-TT corresponding to the outbound port by means of the TSN AF, so that the NW-TT can uniquely identify the flow label information of the current TSN service flow according to the GTP-U tunnel information of the correspondent NW-TT and the flow label information; when the current TSN service is taken as a service packet and a GTP-U outer IPV6 header is encapsulated in the service packet, the flow label information is mapped to a data identifier inside the TSN bridge; two NW-TTs supporting deterministic forwarding by the N19 interface are selected to be sen according to the egress port of the TSNs; and the service packet forwarding timing is controlled according to the gated time slot.

By means of the steps S401 to S404 of receiving first forwarding parameters reported by the TSN AF, wherein the first forwarding parameters are used for representing forwarding parameters of an N19 interface corresponding to a NW-TT of two TSN bridges bearing each TSN session, and the first forwarding parameters are acquired by the TSN AF from a capability parameter reported by one of the two NW-TTs corresponding to each TSN session; acquiring a current TSN service flow to be forwarded, and selecting a target forwarding path from preset paths on the basis of the current TSN service flow and the first forwarding parameters, wherein the current TSN service flow is a service flow forwarded according to the N19 interface; and determining an egress port parameter and a counterpart port parameter for forwarding the current TSN service flow on the basis of the first forwarding parameters corresponding to the target forwarding path, and transmitting preset flow label information, the current TSN service flow and the port parameter to a first NW-TT corresponding to the port parameter according to a preset transmission path, wherein the flow label information is used for representing the unique identifier of the current TSN service flow; the problem in the related art that the deterministic forwarding of the packet cannot be ensured in the scenario of the UE-to-UE intercommunication across UPFs is solved, and the CNC issues deterministic scheduling parameters of the N19 interface to the NW-TT, enabling the TSN service flow transmitted by the UPF to be directed to the egress port that supports the N19 interface and labeled with the counterpart port parameters of the counterpart UPF and a deterministic scheduling policy of the predetermined flow label information, thereby ensuring the beneficial effect of the deterministic transmission of the corresponding TSN service flow in the 5G TSN network bridge.

In some embodiments, the first forwarding parameters are acquired by the TSN AF from a capability parameter reported by one of the two NW-TUs corresponding to each TSN session, and the method includes the following steps:

step 21: the TSN AF receives Ethernet port management response information transmitted by a third NW-TT after responding to an Ethernet port management message, wherein the third NW-TT is one of two NW-TTs bearing a corresponding TSN session;

step 22: the TSN AF detects a first parameter in the Ethernet port management response information, wherein the first parameter is used for representing whether the third NW-TT and a fourth NW-TT which is a counterpart end of the third NW-TT support deterministic forwarding of the N19 interface; and step 23: when detecting the first parameter, the TSN AF sends a forwarding parameter subscription request to the third NW-TT, and receives the first forwarding parameters reported by the third NW-TT, wherein the first forwarding parameters at least comprise information of a user plane GTP-U tunnel of the N19 interface allocated by a corresponding user plane management network element (UPF) entity to bear the third NW-TT and the fourth NW-TT of the corresponding TSN session.

In the present embodiment, the third NW-TT and the fourth NW-TT do not imply that there are four NW-TTs bearing a TSN session, and merely used to refer to the two NW-TTs corresponding to one TSN session. In the present embodiment, the third NW-TT is the NW-TT at the egress port side of the TSN service flow, and the fourth NW-TT is the NW-TT at the counterpart port side corresponding of the egress port.

In the present embodiment, the capability parameters reported by the NW-TT and the forwarding parameters of the N19 interface are accomplished by means of interaction with the TSN AF; furthermore, in the TSN network system, the TSN AF interacts by means of the PF to send an Ethernet port management notification message bearing the TSN capability for acquiring the NW-TT, the message carrying an operation code for obtaining the TSN capability of the NW-TT, and then the PCF interacts with the SMF to continue to send the above Ethernet port management notification message, then, the SMF interacts with the UPF to send the Ethernet port management notification message to the UPF, and then the UPF interacts with the NW-TT to obtain the TSN capability of the NW-TT.

In the present embodiment, after the TSN capability supported by the NW-TT is fed back according to the transmission path of (NW-TT)-UPF-SMF-PCF-(TSN AF), the TSN AF determines whether the corresponding NW-TT supports deterministic forwarding of the N19 interface, and after it is determined that the corresponding NW-TT supports the deterministic forwarding of the N19 interface, the forwarding parameters for deterministic forwarding of the N19 interface are then subscribed from the corresponding NW-TT, so that when the NW-TT receives the corresponding TSN session, deterministic forwarding is performed by means of the NW-TT.

In the present embodiment, after receiving the corresponding subscription signaling, the NW-TT will allocate corresponding forwarding parameters (for example, GTP-U tunnel information of the N19 interface) for the corresponding TSN session on the basis of the UPF, in other words, a GTP-U tunnel is constructed by allocating corresponding forwarding parameters of deterministic forwarding for the NW-TT, and after the GTP-U tunnel is established, the forwarding parameters of the N19 interface of two NW-TUs bearing one TSN session, i.e., the first forwarding parameters, are reported to the TSN AF along the transmission path of (NW-TT)-UPF-SMF-PCF-(TSN AF), and then are reported to the CNC by the TSN AF, so as to obtain the forwarding parameters of the NW-TT.

It should be noted that, in the present embodiment, the forwarding parameters corresponding to the NW-TT are allocated by the corresponding UPF. In some optional implementations, the first forwarding parameters reported by the NW-TT includes: GTP-U tunnel information of an N19 interface allocated for the NW-TT and a time delay between the NWTs of two TSNs bridges.

By means of the foregoing steps of the TSN AF receiving Ethernet port management response information transmitted by a third NW-TT after responding to an Ethernet port management message, wherein the third NW-TT is one of two NW-TTs bearing a corresponding TSN session; the TSN AF detecting a first parameter in the Ethernet port management response information, wherein the first parameter is used for representing whether the third NW-TT and a fourth NW-TT which is a counterpart end of the third NW-TT support deterministic forwarding of the N19 interface; and when detecting the first parameter, the TSN AF sending a forwarding parameter subscription request to the third NW-TT, and receiving the first forwarding parameters reported by the third NW-TT, wherein the first forwarding parameters at least comprise information of a user plane GTP-U tunnel of the N19 interface allocated by a corresponding user plane management network element (UPF) entity to bear the third NW-TT and the fourth NW-TT of the corresponding TSN session, capability for the TSN bridge to report forwarding parameters of the N19 interface are achieved, so that the CNC can perform network configuration to generate a scheduling policy for the TSN flows, and then the NW-TT implements deterministic TSN service flow scheduling, that is, the NW-TT implements deterministic forwarding.

In some of the embodiments, after the TSN AF sends the forwarding parameter subscription request, the following steps are further implemented: after completing construction of the GTP-U tunnel allocated by the corresponding UPF entity, the third NW-TT sends the first forwarding parameters to the TSN AF.

In the present embodiment, before reporting the corresponding first forwarding parameters to the TSN AF, the NW-TT at the TSN egress port side (i.e., the third NW-TT) needs to construct a GTP-U tunnel on the basis of the forwarding parameters (for example, the GTP-U tunnel information of the N19 interface) allocated by the corresponding UPF, that is, reports the corresponding first forwarding parameters after establishing intercommunication over the N19 interface with the NW-TT at the counterpart end.

Figure 5:
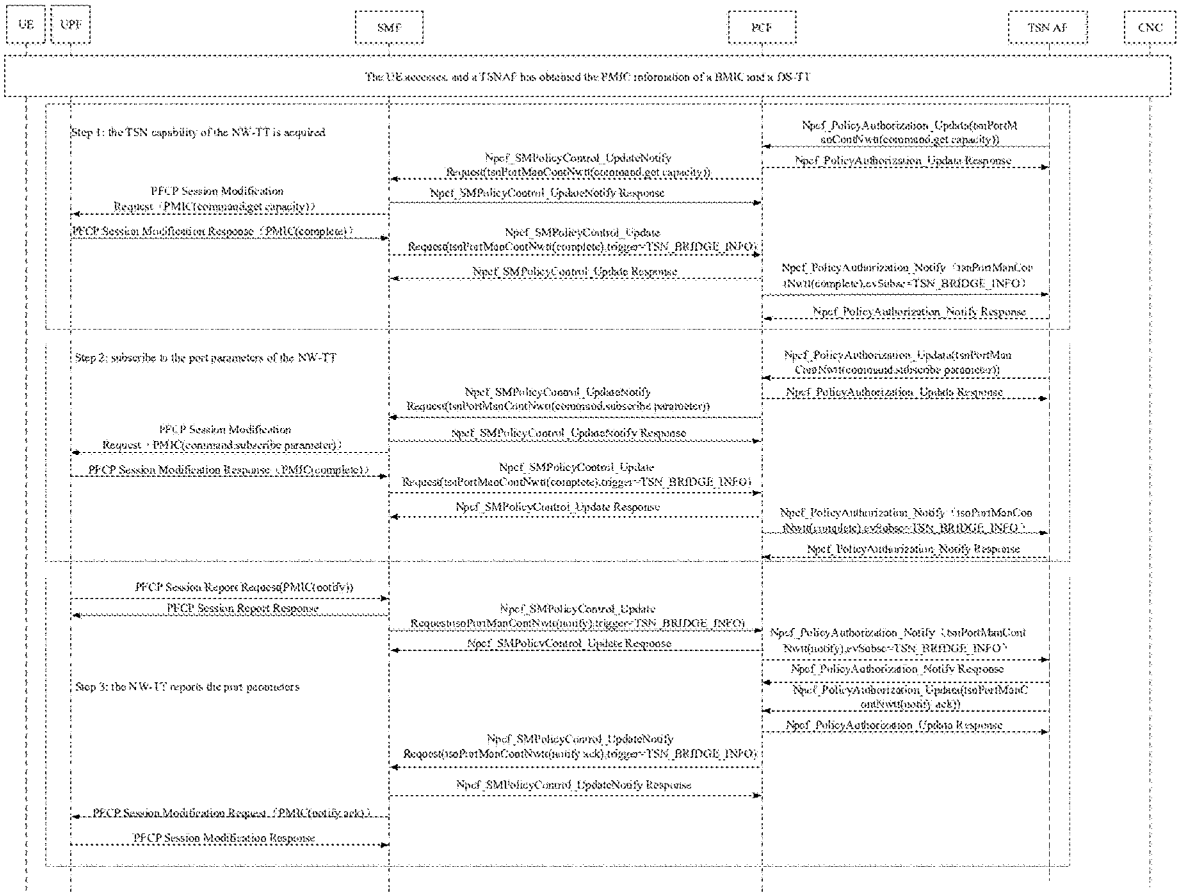
FIG. 5 is a schematic diagram illustrating a time sequence of a TSN bridge reporting forwarding parameters according to a preferred embodiment of the present application.

FIG. 5 is a schematic diagram illustrating a time sequence of a TSN bridge reporting a forwarding parameter according to a preferred embodiment of the present application. Refer to FIG. 5, in some optional embodiments, the forwarding parameters of the NW-TT are reported according to the following steps:

Step 1: the TSN capability of the NW-TT is acquired.

In the present embodiment, the TSN AF needs to obtain the TSN capability of the NW-TT to determine whether to support the deterministic forwarding of the N19 interface; specifically, the TSN AF sends a MANAGE ETHERNET PORT COMMAND message (corresponding to the Ethernet port management message) defined in the 24519 protocol to the NW-TT by means of a transmission path (an existing protocol flow) of (TSN AF)-PCF-SMF-UPF-(NW-TT), and an operation code of Get capabilities is carried in the MANAGE ETHERNET PORT COMMAND message; the NW-TT returns the capabilities supported thereby to the TSN AF, and sends a MANAGE ETHERNET PORT COMPLETE message (corresponding to the Ethernet port management response message) defined in the 24519 protocol to the TSN AF by means of a transmission path of (NW-TT)-UPF-SMF-PCF-(TSN AF). In the present embodiment, a parameter is extended for the deterministic forwarding of the N19 interface, and the recorded value IE thereof is 8001H; if the NW-TT supports the deterministic forwarding of the N19 interface, the IE is carried in the MANAGE ETHERNET PORT COMPLETE message.

It should be noted that the NW-TT of the TSN bridge (refer to FIG. 3) in the TSN network system is coupled to the UPF, and therefore the NW-TT is not shown in FIG. 5.

Step 2: the TSN capability of the NW-TT is subscribed.

In the present embodiment, if the TSN AF determines that the NW-TT bearing the TSN session supports the deterministic forwarding of the N19 interface, it subscribes to the deterministic forwarding parameters of the N19 interface from the NW-TT. In the present embodiment, the TSN AF sends a MANAGE ETHERNET PORT COMMAND message defined in the 24519 protocol to the NW-TT by means of a transmission path of (TSN AF)-PCF-SMF-UPF-(NW-TT), the message carrying an operation code of Subscribe-notify for parameter, and carries a parameter of 8001H.

Step 3: the NW-TT reports the port parameters.

In the present embodiment, after establishing the GTP-U tunnel allocated for the UPF, the NW-TT reports the forwarding parameters of the deterministic forwarding of the N19 interface to the TSN AF. In the present embodiment, the UPF allocates the GTP-U tunnel of the N19 interface to the TSN session, and the NW-TT sends the ETHERNET PORT MANAGEMENT NOTIFY message defined in 24519 to the TSN AF by means of the transmission path of (NW-TT)-UPF-SMF-PCF-(TSN AF), the message carrying the state of the forwarding parameters (8001H) of the N19 interface, specifically comprising: a GTP-U tunnel allocated by the NW-TT and a time delay between the NW-TTs of two TSN bridges.

The corresponding instructions in FIG. 5 in the present embodiment are explained as follows:

Npcf_PolicyAuthorization_Updata(tsnPortManContNwtt (command.get capacity))//TSN-AF sends an Npcf_PolicyAuthorization_Updata request message to the PCF, the request message including a MANAGE ETHERNET PORT COMMAND message, and the message carrying an operation code of Get capabilities, wherein Npcf_PolicyAuthorization represents a service interface, and Npcf_PolicyAuthorization_Updata represents a service interface download;

Npcf_PolicyAuthorization_Updata Response//PCF sends an Npcf_PolicyAuthorization_Updata response message to the TSN-AF.

The Npcf_SMPolicyControl_UpdateNotify Request(tsnPortManContNwtt(command.get capacity))//PCF sends an Npcf_SMPolicyControl_UpdateNotify request message to the SMF, the request message carrying a MANAGE ETHERNET PORT COMMAND message, and the message carrying an operation code of Get capabilities, wherein Npcf_SMPolicyControl_UpdateNotify represents an SMP policy control update notification.

The Npcf_SMPolicyControl_UpdateNotify Response//SMF sends an Npcf_SMPolicyControl_UpdateNotify response message to the PCF.

The PFCP Session Modification Request (PMIC(command.get capacity))//SMF sends a PFCP Session Modification request message to the UPF, the message carrying a MANAGE ETHERNET PORT COMMAND message, and the request message carrying an operation code of Get capabilities, wherein PFCP Session Modification represents a PFCP session modification.

The PFCP Session Modification Response (PMIC(complete))//UPF sends a PFCP Session Modification response message to the SMF, the message carrying a MANAGE ETHERNET PORT COMPLETE message.

Npcf_SMPolicyControl_Update Request(tsnPortManContNwtt(complete), trigger=TSN_BRIDGE_INFO)//SMF sends an Npcf_SMPolicyControl_Update request message to the PCF, the request message carrying a MANAGE ETHERNET PORT COMPLETE message, and Npcf_SMPolicyControl_Update indicating that the SMP policy controls downloading.

Npcf_SMPolicyControl_Update Response//PCF sends an Npcf_SMPolicyControl_Update response message to the SMF.

Npcf_PolicyAuthorization_Notify(tsnPortManContNwtt (complete), evSubsc=TSN_BRIDGE_INFO)//PCF sends an Npcf_PolicyAuthorization_Notify request message to the TSN-AF, the request message carrying a MANAGE ETHERNET PORT COMPLETE message, wherein Npcf_PolicyAuthorization_Notify represents a service interface notification.

Npcf_PolicyAuthorization_Notify Response//TSN-AF sends an Npcf_PolicyAuthorization_Notify response message to the PCF.

Npcf_PolicyAuthorization_Updata(tsnPortManContNwtt (command.subscribe parameter))//TSN-AF sends an Npcf_Policy Authorization_Updata request message to the PCF, the request message carrying a MANAGE ETHERNET PORT COMMAND message, and carrying an operation code "Subscription-notify for parameter".

Npcf_PolicyAuthorization_Updata Response//PCF sends an Npcf_PolicyAuthorization_Updata response message to the TSN-AF.

Npcf_SMPolicyControl_UpdateNotify Request(tsnPortManContNwtt(command.subscribe parameter))//PCF sends an Npcf_SMPolicyControl_UpdateNotify request message to the SMF, the request message carrying a MANAGE ETHERNET PORT COMMAND message and carrying an operation code "Subscribe-notify for parameter".

The Npcf_SMPolicyControl_UpdateNotify Response// SMF sends an Npcf_SMPolicyControl_UpdateNotify response message to the PCF.

The PFCP Session Modification Request(PMIC(command.subscribe parameter))//SMF sends a PFCP Session Modification request message to the UPF, the request message carrying a MANAGE ETHERNET PORT COMMAND message and carrying an operation code "Subscription-notify for parameter".

The PFCP Session Modification Response(PMIC(complete))//UPF sends the PFCP Session Modification response message and the MANAGE ETHERNET PORT COMPLETE message to the SMF.

Npcf_SMPolicyControl_Update Request(tsnPortManContNwtt(complete), trigger=TSN_BRIDGE_INFO)//SMF sends an Npcf_SMPolicyControl_Update request message to the PCF, the request message carrying MANAGE ETHERNET PORT COMPLETE information.

Npcf_SMPolicyControl_Update Response//PCF sends an Npcf_SMPolicyControl_Update response message to the SMF.

Npcf_Policy Authorization_Notify (tsnPortManContNwt (complete), evSubsc=TSN_BRIDGE_INFO)//the PCF sends an Npcf_Policy Authorization_Notify request message to the TSN-AF, the message carrying MANAGE ETHERNET PORT COMPLETE information.

Npcf_PolicyAuthorization_Notify Response//TSN-AF sends an Npcf_PolicyAuthorization_Notify response message to the PCF.

The PFCP Session Report Request (PMIC(notify))//UPF sends a PFCP Session Report request message to the SMF, the request message carrying an ETHERNET PORT MANAGEMENT NOTIFY message, and the PFCP Session Report representing a PFCP conference report.

The PFCP Session Report Response//SMF sends a PFCP Session Report response message to the UPF.

Npcf_SMPolicyControl_Update Request (tsnPortManContNwt(notify), trigger=TSN_BRIDGE_INFO)//SMF sends an Npcf_SMPolicyControl_Update request message to the PCF, the request message carrying an ETHERNET PORT MANAGEMENT NOTIFY message.

Npcf_SMPolicyControl_Update Response//PCF sends an Npcf_SMPolicyControl_Update response message to the SMF.

Npcf_Policy Authorization_Notify (tsnPortManContNwt (notify), evSubsc=TSN_BRIDGE_INFO)//the PCF sends an Npcf_Policy Authorization_Notify request message to the TSN-AF, the message carrying an ETHERNET PORT MANAGEMENT NOTIFY message.

Npcf_PolicyAuthorization_Notify Response//TSN-AF sends an Npcf_PolicyAuthorization_Notify response message to the PCF.

Npcf_PolicyAuthorization_Updata(tsnPortManContNwtt (notify ack))//TSN-AF sends an Npcf_Policy Authorization_Updata request message to the PCF, the message carrying an ETHERNET PORT MANAGEMENT NOTIFY ACK message.

Npcf_PolicyAuthorization_Updata Response//PCF sends an Npcf_PolicyAuthorization_Updata response message to the TSN-AF.

Npcf_SMPolicyControl_UpdateNotify Request(tsnPortManContNwtt(notify ack), trigger=TSN_BRIDGE_INFO)// PCF sends an Npcf_SMPolicyControl_UpdateNotify request message to the SMF, the request message carrying an ETHERNET PORT MANAGEMENT NOTIFY ACK message.

The Npcf_SMPolicyControl_UpdateNotify Response// SMF sends an Npcf_SMPolicyControl_UpdateNotify response message to the PCF.

PFCP Session Modification Request (PMIC(notify ack))// an SMF sends a PFCP Session Modification request message to the UPF, the request message carrying an ETHERNET PORT MANAGEMENT NOTIFY ACK message.

PFCP Session Modification Response//UPF sends a PFCP Session Modification response message to the SMF.

In some embodiments, controlling the first NW-TT to generate the forwarded packet in the preset format on the basis of the flow label information, the current TSN service flow and the counterpart port parameter is implemented by means of the following steps:

step 31: the first NW-TT acquires first GTP-U tunnel information corresponding to the N19 interface of the second NW-TT;

step 32: the first NW-TT generates a first data identifier in a preset format on the basis of the flow label information; and step 33: the first NW-TT converts the current TSN service flow into a service packet, and encapsulates the first GTP-U tunnel information and the first data identifier into an IPv6 header of the service packet to obtain the forwarded packet.

In the present embodiment, the first NW-TT is an NW-TT corresponding to the egress port side of the TSN service flow; the corresponding TSN configuration information is encapsulated by the CNC and then sent to the TSN AF; the TSN AF decomposes the corresponding TSN configuration information to obtain two parts of data, and sends same to the first NW-TT; specifically, the TSN AF encapsulates a part of information into a Set parameter operation of a message defined in a 24519 protocol, and sends same to the NW-TT to control the egress port and gated time slot of the TSN service flow, and accordingly, the CNC allocates the egress port and the corresponding gated time slot for the TSN service flow; the TSN AF encapsulates the other part of the information into an Npcf_PolicyAuthorization_Notify message and sends same to the PCF, and controls the NW-TT to label, with the first GTP-U tunnel information and the first data identifier of the counterpart UPF, the forwarded packet that needs to be forwarded by means of the N19 interface.

It should be noted that, the CNC controls the NW-TT to label the TSN service flow with the flow label information, so that the generated forwarded packet corresponds to the flow label information of the outer layer of the GTP-U and can uniquely identify the current TSN service flow; furthermore, the NW-TT maps the flow label information into a first data identifier which can be identified by the NW-TT.

In the foregoing steps of acquiring, by the first NW-TT, first GTP-U tunnel information corresponding to the N19 interface of the second NW-TT; generating a first data identifier in a preset format on the basis of the flow label information; converting the current TSN service flow into a service packet, and encapsulating the first GTP-U tunnel information and the first data identifier into an IPv6 header of the service packet to obtain the forwarded packet, so that the decomposition of the TSN configuration information is achieved, a corresponding NW-TT realizes the encapsulation of the service packet; furthermore, the first GTP-U tunnel information and the first data representation are encapsulated into an IPv6 header of a forwarded packet, so that the CNC can quickly determine a forwarding path and scheduling parameters during deterministic forwarding, thereby ensuring deterministic forwarding of a corresponding TSN service flow within a 5G TSN bridge.

In some embodiments, determining the egress port parameter and the counterpart port parameter for forwarding the current TSN service flow on the basis of the first forwarding parameter corresponding to the target forwarding path is implemented by the following steps:

step 41: the GTP-U tunnel information allocated by the corresponding UPF entity to the third NW-TT and the fourth NW-TT respectively are acquired from the first forwarding parameter.

In the present embodiment, the egress port of the TSN service flow, that is, the GTP-U tunnel information of the third NW-TT, is determined according to the first forwarding parameters, meanwhile, when the UPF allocates the forwarding parameters of the N19 interface to the NW-TT, the corresponding forwarding parameters are allocated by taking a pair of NW-TTs as allocation objects, therefore, after the egress port of the TSN service flow is determined, the corresponding counterpart port, that is, the GTP-U tunnel information of the fourth NW-TT, is accordingly determined.

Step 42: a corresponding gated time slot is allocated to the N19 interface of the third NW-TT, it is determined that the egress port parameters include the GTP-U tunnel information and the gated time slot allocated to the third NW-TT, and it is determined that the egress port parameters include GTP-U tunnel information allocated to the fourth NW-TT.

By the foregoing steps of acquiring, from the first forwarding parameter, the GTP-U tunnel information allocated by the corresponding UPF entity to the third NW-TT and the fourth NW-TT respectively; allocating a corresponding gated time slot to the N19 interface of the third NW-TT, determining that the egress port parameter comprises the GTP-U tunnel information and the gated time slot which are allocated for the third NW-TT, and determining that the egress port parameter comprises the GTP-U tunnel information allocated for the fourth NW-TT, it is achieved that after obtaining the N19 interface parameter of the NW-TT, the CNC configures the TSN configuration information and defines a scheduling policy of the TSN service flow, so that the corresponding NW-TT implements deterministic forwarding of the TSN service flow.

In some embodiments, acquiring the current TSN service flow to be forwarded, and selecting the target forwarding path from preset paths on the basis of the current TSN service flow and the first forwarding parameters is implemented by means of the following steps:

step 51: a first preset parameter table is acquired, wherein the first preset parameter table at least comprises correlation information between a TSN service flow and a time parameter of the TSN service flow reaching each TSN network node on a preset path, a TSN network node corresponding to each preset path at least comprising two NW-TTs bearing the corresponding TSN session.

In the present embodiment, the CNC maintains a time delay table for a TSN service flow to reach each node of the TSN network and a traffic scheduling time slot occupation table, and by looking up the table, selects, from preset paths in the table, a path with a delay/idle scheduling time slot complying with a requirement, that is, a target forwarding path.

Step 52: a preset path corresponding to the current TSN service flow, so as to obtain candidate paths is queried in the first preset parameter table, and a candidate path, on which a time parameter of the TSN service flow reaching each TSN network node on the preset path satisfies a preset time parameter threshold, is selected from the candidate path.

In the present embodiment, a TSN network node comprises: a radio access network (RAN), a DS-TT and an NW-TT, which can distinguish nodes of a TSN service flow, and issue deterministic scheduling parameters at these nodes, so that deterministic forwarding of the TSN service flow can be completed. In the present embodiment, the time parameters of the TSN service flow reaching each TSN network node on a preset path comprise a time delay/gap scheduling time slot between two adjacent TSN network nodes, and a time delay (end-to-end time delay)/gap scheduling time slot between NW-TTs of two TSN bridges corresponding to the TSN session. In the present embodiment, the time delay is taken as a corresponding time parameter.

In the present embodiment, a path on which a time delay satisfies a set requirement is selected from preset paths by using a set time parameter threshold, that is, a time delay threshold, and is used as a candidate path.

Step 53: the target forwarding path is selected from the candidate paths on the basis of the first forwarding parameters, wherein the forwarding parameters of the N19 interface corresponding to the NW-TT corresponding to the target forwarding path comprise the first forwarding parameters.

In the present embodiment, from among the candidate paths, a path is selected where the N19 interface forwarding parameters of the corresponding NW-TT match those in the first forwarding parameters (specifically, matching the corresponding GTP-U tunnel information), thus determining the target forwarding path.

By means of the foregoing steps of acquiring a first preset parameter table, wherein the first preset parameter table at least comprises correlation information between a TSN service flow and a time parameter of the TSN service flow reaching each TSN network node on a preset path, a TSN network node corresponding to each preset path at least comprising two NW-TTs bearing the corresponding TSN session; querying, in the first preset parameter table, a preset path corresponding to the current TSN service flow, so as to obtain candidate paths, and selecting, from the candidate path, a candidate path on which a time parameter of the TSN service flow reaching each TSN network node on the preset path satisfies a preset time parameter threshold; and selecting the target forwarding path from the candidate paths on the basis of the first forwarding parameters, wherein the forwarding parameters of the N19 interface corresponding to the NW-TT corresponding to the target forwarding path comprise the first forwarding parameters, the determination of the forwarding path is achieved, so that the NW-TT can implement deterministic scheduling of a TSN service flow.

It should be noted that, in the present embodiment, after receiving the forwarding parameters (i.e. the first forwarding parameters) of the N19 interface of the NW-TT, the CNC performs network configuration and defines a scheduling policy of the TSC flow by referring to a service flow burst period, a service flow volume, a network time delay, and TSN bearer network reserved resources; furthermore, after the CNC knows the time delay between the NW-TTs of the two TSN bridges, in combination with the time delays reported independently by the two TSN bridges, the CNC can know the time delay of each TSN bridge of two TSN bridges bearing one TSN session in the scenario of the UEs communicating with each other by means of the N19 interface; furthermore, if two UEs need to forward packets by means of the N19 interface, the CNC needs to send the GTP-U tunnel information of the N19 interface, the service and network layer parameter mapping table, and the scheduling list to the NW-TT, so that the NW-TT can implement the deterministic scheduling of TSN service flows.

In some of the embodiments, the time parameter comprises a first time delay and a second time delay, the first time delay being a time delay between two adjacent TSN network nodes, The second delay is a delay between NWTs of two TSN bridges corresponding to a TSN session, selecting alternative paths of which the time parameters of the TSN service flow reaching various TSN network nodes on the preset path meet the preset time parameter threshold, This is achieved by the following steps:

step 61: on the basis of the first time delay and the number of TSN nodes that each of the TSN bridges has, a third time delay corresponding to each of the TSN bridges corresponding to each of the preset paths is respectively determined;

step 62: the third time delay and the second time delay corresponding to the two TSN bridges corresponding to each preset path are accumulated to obtain a corresponding total time delay of the TSN service flow reaching each TSN network node on the preset path; and step 63: it is determined whether the total time delay corresponding to each of the preset paths is less than a time delay threshold corresponding to the preset time parameter threshold, and it is determined that the candidate paths comprise the preset path on which the total time delay is less than the time delay threshold.

By means of the foregoing steps of respectively determining, on the basis of the first time delay and the number of TSN nodes that each of the TSN bridges has, a third time delay corresponding to each of the TSN bridges corresponding to each of the preset paths; accumulating the third time delay and the second time delay corresponding to the two TSN bridges corresponding to each preset path, to obtain a corresponding total time delay of the TSN service flow reaching each TSN network node on the preset path; and determining whether the total time delay corresponding to each of the preset paths is less than a time delay threshold corresponding to the preset time parameter threshold, and determining that the candidate paths comprise the preset path on which the total time delay is less than the time delay threshold; a target forwarding path is selected on the basis of the time delay, so that the NW-TT can implement deterministic scheduling of the TSN service flow.

Figure 6:
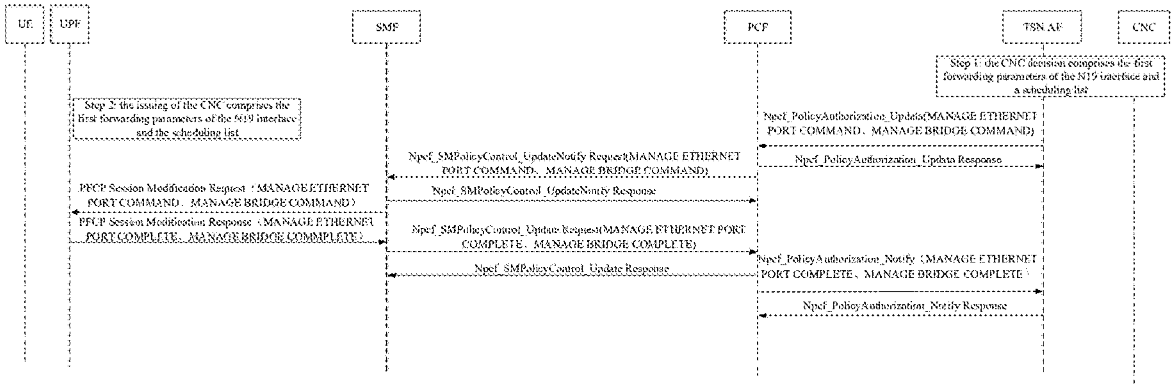
FIG. 6 is a schematic diagram illustrating a time sequence of an RNC transmitting a target transmission path and a scheduling list according to a preferred embodiment of the present application.

FIG. 6 is a schematic diagram illustrating a time sequence of an RNC transmitting a target transmission path and a scheduling list according to a preferred embodiment of the present application. Refer to FIG. 6, in some optional implementations, the forwarding parameters of the N19 interface and the scheduling list are issued according to the following steps:

step 1: the CNC decision comprises first forwarding parameters and a scheduling list of the N19 interface.

In the present embodiment, after receiving the first forwarding parameters of the N19 interface, the CNC implements network configuration and defines the scheduling policy of the TSC with reference to information such as a service flow burst period, service traffic, a network delay, and reserved resources of the TSN bearer network. After the RNC knows the time delay between the NW-TTs of the two TSN bridges, in combination with the time delays reported independently by the two TSN bridges, the RNC can know the time delay of each TSN bridge of two TSN bridges bearing one TSN session in the scenario of the UEs communicating with each other by means of the N19 interface; furthermore, if two UEs need to forward packets by means of the N19 interface, the CNC needs to send the GTP-U tunnel information of the N19 interface, the service and network layer parameter mapping table, and the scheduling list to the NW-TT, so that the NW-TT can implement the deterministic scheduling of TSN service flows. In the present embodiment, the CNC maintains a time delay table of a TSN service flow reaching each node of the TSN network and a traffic scheduling time slot occupation table, so as to select, from the candidate paths, a path with a time delay/idle scheduling time slot complying with the requirements. In the present embodiment, the CNC controls an NW-TT to label the TSN flow with flow label information, so that the flow label information on the outer layer of the GTP-U can uniquely identify a current TSN flow; the NW-TT maps the flow label information as a first data identifier; and the CNC allocates, to the TSN flow, an egress port and a gated time slot corresponding to first data representation.

Step 2: the issuing of the CNC comprises the first forwarding parameters of the N19 interface and the scheduling list.

In the present embodiment, the CNC encapsulates the scheduling policy of the TSC flow and sends same to the TSN AF; the TSN AF decomposes the scheduling policy of the TSC flow into two parts; the TSN AF encapsulates a part of information in a Set parameter operation of a message defined in the 24519 protocol, and sends same to the NW-TT, so as to control the egress port and the gated time slot of the TSN flow; the TSN AF encapsulates the other part of information in an Npcf_Policy Authorization_Notify message and sends the same to the PCF, and controls the NW-TT to label, with the GTP-U tunnel information of the counterpart UPF and the preset flow label information, the forwarded packet that needs to be forwarded by means of the N19 interface; the Npcf_SMPolicyControl_UpdateNotify Request message sent by the PCF to the SMF needs to carry the MANAGE ETHERNET PORT COMMAND message and the MANAGE BRIDGE COMMAND message defined in the 24519 protocol, and the flow label information is carried in the filter of the bridge information and the port information; furthermore, a PCC rule is also issued for the forwarded packet that needs to be forwarded by means of the N19 interface, and the GTP-U tunnel information of the counterpart end of the N19 interface and the allocated flow label information are carried in Traffic Control Data; a PFCP Session Modification Request message issued by the SMF to the UPF comprises N4 rules such as a PDR and an FAR, wherein the PDR comprises the service feature of a forwarded packet passing through the N19 interface, and the FAR comprises the GTP-U tunnel information of the counterpart end of the N19 interface and the allocated flow label information; the NW-TT encapsulates the service packet into the GTP-U outer IPV6 header according to the GTP-U tunnel information of the counterpart end of the N19 interface and the allocated flow label information, and fills in the flow label information, selects, according to a issued egress port, to send a port supporting the N19 tunnel; and controls timing of packet sending according to a issued gating list.

The corresponding instructions in FIG. 6 in the present embodiment are explained as follows:

Npcf_PolicyAuthorization_Updata(MANAGE ETHERNET PORT COMMAND, MANAGE BRIDGE COMMAND)//TSN-AF sends an Npcf_PolicyAuthorization_Updata request message to the PCF, the message comprising a MANAGE ETHERNET PORT COMMAND message and a MANAGE BRIDGE COMMAND message.

Npcf_PolicyAuthorization_Updata Response//PCF sends an Npcf_PolicyAuthorization_Updata response message to the TSN-AF.

Npcf_SMPolicyControl_UpdateNotify Request (MANAGE ETHERNET PORT COMMAND, MANAGE BRIDGE COMMAND)//PCF sends an Npcf_SMPolicyControl_UpdateNotify request message to the SMF, the request message comprising a MANAGE ETHERNET PORT COMMAND message and a MANAGE BRIDGE COMMAND message.

The Npcf_SMPolicyControl_UpdateNotify Response//SMF sends an Npcf_SMPolicyControl_UpdateNotify response message to the PCF.

PFCP Session Modification Request (MANAGE ETHERNET PORT COMMAND, MANAGE BRIDGE COMMAND)//an SMF sends a PFCP Session Modification request message to the UPF, the message comprising a MANAGE ETHERNET PORT COMMAND message and a MANAGE BRIDGE COMMAND message.

PFCP Session Modification Response (MANAGE ETHERNET PORT COMPLETE, MANAGE BRIDGE COMPLETE)//a UPF sends a PFCP Session Modification response message to the SMF, the message carrying a MANAGE ETHERNET PORT COMPLETE message and a MANAGE BRIDGE COMPLETE message.

Npcf_SMPolicyControl_Update Request (MANAGE ETHERNET PORT COMPLETE, MANAGE BRIDGE COMPLETE)//SMF sends an Npcf_SMPolicyControl_Update request message to the PCF, the request message carrying a MANAGE ETHERNET PORT COMPLETE message and a MANAGE BRIDGE COMPLETE message.

Npcf_SMPolicyControl_Update Response//PCF sends an Npcf_SMPolicyControl_Update response message to the SMF.

Npcf_PolicyAuthorization_Notify (MANAGE ETHERNET PORT COMPLETE, MANAGE BRIDGE COMPLETE)//PCF sends an Npcf_PolicyAuthorization_Notify request message to the TSN-AF, in the message carrying a MANAGE ETHERNET PORT COMPLETE message and a MANAGE BRIDGE COMPLETE message.

Npcf_PolicyAuthorization_Notify Response//TSN-AF sends an Npcf_PolicyAuthorization_Notify response message to the PCF.

The present embodiment further provides an apparatus for cross-network element deterministic forwarding, and the apparatus is used for implementing the embodiments and preferred embodiments above, and what has been described will not be described repeatedly here. As used below, the terms “module”, “unit”, “subunit” and the like may implement a combination of software and/or hardware of predetermined functions. Although the apparatus described in the following embodiments is preferably implemented in software, implementation in hardware or a combination of software and hardware is also possible and conceived.

Figure 7:
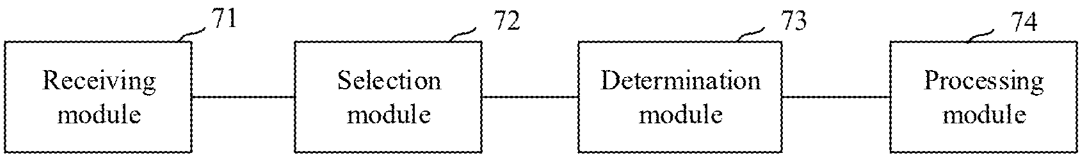
FIG. 7 is a structural block diagram of an apparatus for cross-network element deterministic forwarding according to an embodiment of the present application.

FIG. 7 is a structural block diagram of an apparatus for cross-network element deterministic forwarding according to an embodiment of the present application. As shown in FIG. 7, the apparatus includes:

- a receiving module 71, configured to receive a first forwarding parameter reported by a time-sensitive network (TSN) application function (AF), wherein the first forwarding parameter is used for representing a forwarding parameter of an N19 interface corresponding to a network TSN translator (NW-TT) of two TSN bridges bearing each TSN session, and the first forwarding parameter is acquired by the TSN AF from a capability parameter reported by one of the two NW-TTs corresponding to each TSN session;
- a selection module 72, which is coupled to the receiving module 71 and configured to acquire a current TSN service flow to be forwarded, and select a target forwarding path from preset paths on the basis of the current TSN service flow and the first forwarding parameter, wherein the current TSN service flow is a service flow forwarded according to the N19 interface;
- a determination module 73, which is coupled to the selection module 72 and configured to determine an egress port parameter and a counterpart port parameter for forwarding the current TSN service flow on the basis of the first forwarding parameter corresponding to the target forwarding path, and transmit preset flow label information, the current TSN service flow and the port parameter to a first NW-TT corresponding to the port parameter according to a preset transmission path, wherein the flow label information is used for representing the unique identifier of the current TSN service flow; and
- a processing module 74, which is coupled to the determination module 73 and configured to control the first NW-TT to generate a forwarded packet in a preset format on the basis of the flow label information, the current TSN service flow and the counterpart port parameter, and performing cross-network element deterministic forwarding on the forwarded packet when the first NW-TT performs intercommunication with the N19 interface of the second NW-TT corresponding to the counterpart port parameter.

By means of the apparatus for cross-network element deterministic forwarding in the embodiments of the present application, by receiving first forwarding parameters reported by the TSN AF, wherein the first forwarding parameters are used for representing forwarding parameters of an N19 interface corresponding to a NW-TT of two TSN bridges bearing each TSN session, and the first forwarding parameters are acquired by the TSN AF from a capability parameter reported by one of the two NW-TTs corresponding to each TSN session; acquiring a current TSN service flow to be forwarded, and selecting a target forwarding path from preset paths on the basis of the current TSN service flow and the first forwarding parameters, wherein the current TSN service flow is a service flow forwarded according to the N19 interface; and determining an egress port parameter and a counterpart port parameter for forwarding the current TSN service flow on the basis of the first forwarding parameters corresponding to the target forwarding path, and transmitting preset flow label information, the current TSN service flow and the port parameter to a first NW-TT corresponding to the port parameter according to a preset transmission path, wherein the flow label information is used for representing the unique identifier of the current TSN service flow; the problem in the related art that the deterministic forwarding of the packet cannot be ensured in the scenario of the UE-to-UE intercommunication across UPFs is solved, and the CNC issues deterministic scheduling parameters of the N19 interface to the NW-TT, enabling the TSN service flow transmitted by the UPF to be directed to the egress port that supports the N19 interface and labeled with the counterpart port parameters of the counterpart UPF and a deterministic scheduling policy of the predetermined flow label information, thereby ensuring the beneficial effect of the deterministic transmission of the corresponding TSN service flow in the 5G TSN network bridge.

In some of the embodiments, the receiving module 71 is further configured to receive, by means of the TSN AF, Ethernet port management response information transmitted by a third NW-TT after responding to an Ethernet port management message, wherein the third NW-TT is one of two NW-TTs bearing a corresponding TSN session; the TSN AF detecting a first parameter in the Ethernet port management response information, wherein the first parameter is used for representing whether the third NW-TT and a fourth NW-TT which is a counterpart end of the third NW-TT support deterministic forwarding of the N19 interface; and when detecting the first parameter, the TSN AF sending a subscription forwarding parameter request to the third NW-TT, and receiving the first forwarding parameters reported by the third NW-TT, wherein the first forwarding parameters at least comprise information of a user plane GTP-U tunnel of the N19 interface allocated by a corresponding user plane management network element (UPF) entity to bear the third NW-TT and the fourth NW-TT of the corresponding TSN session.

In some of the embodiments, the receiving module 71 is further configured to send, after the TSN AF sends the forwarding parameter subscription request to the third NW-TT, the first forwarding parameters to the TSN AF after the third NW-TT completes construction of the GTP-U tunnel allocated by the corresponding UPF entity.

In some of the embodiments, the processing module 74 is further configured to control the first NW-TT to obtain first GTP-U tunnel information corresponding to the N19 interface of the second NW-TT; generate a first data identifier in a preset format on the basis of the flow label information; and convert the current TSN service flow into a service packet, and encapsulate the first GTP-U tunnel information and the first data identifier into an IPv6 header of the service packet to obtain the forwarded packet.

In some of the embodiments, the determination module 73 further comprises:

- a first acquisition unit, configured to acquire, from the first forwarding parameter, the GTP-U tunnel information allocated by the corresponding UPF entity to the third NW-TT and the fourth NW-TT respectively;
- a first allocation unit, which is coupled to the first acquisition unit and is configured to allocate a corresponding gated time slot to the N19 interface of the third NW-TT, determine that the egress port parameter comprises the GTP-U tunnel information and the gated time slot which are allocated for the third NW-TT, and determine that the egress port parameter comprises the GTP-U tunnel information allocated for the fourth NW-TT.

In some of the embodiments, the selection module 72 further comprises:

- a second acquisition unit, configured to acquire a first preset parameter table, wherein the first preset parameter table at least comprises correlation information between a TSN service flow and a time parameter of the TSN service flow reaching each TSN network node on a preset path, a TSN network node corresponding to each preset path at least comprising two NW-TTs bearing the corresponding TSN session;
- a first query unit, which is coupled to the second acquisition unit and is configured to query, in the first preset parameter table, a preset path corresponding to the current TSN service flow, so as to obtain candidate paths, and select, from the candidate path, a candidate path on which a time parameter of the TSN service flow reaching each TSN network node on the preset path satisfies a preset time parameter threshold; and
- a first selection unit, which is coupled to the first query unit and configured to select the target forwarding path from the candidate paths on the basis of the first forwarding parameters, wherein the forwarding parameters of the N19 interface corresponding to the NW-TT corresponding to the target forwarding path comprise the first forwarding parameters.

In some of the embodiments, the time parameters comprise a first time delay and a second time delay, the first time delay is a time delay between two adjacent TSN network nodes, and the second time delay is a time delay between the NW-TTs of two TSN bridges corresponding to the TSN session, and the first query unit is further configured to respectively determine, on the basis of the first time delay and the number of TSN nodes that each of the TSN bridges has, a third time delay corresponding to each of the TSN bridges corresponding to each of the preset paths; accumulate the third time delay and the second time delay corresponding to the two TSN bridges corresponding to each preset path, to obtain a corresponding total time delay of the TSN service flow reaching each TSN network node on the preset path; and determining whether the total time delay corresponding to each of the preset paths is less than a time delay threshold corresponding to the preset time parameter threshold, and determine that the candidate paths comprise the preset path on which the total time delay is less than the time delay threshold.

Figure 8:
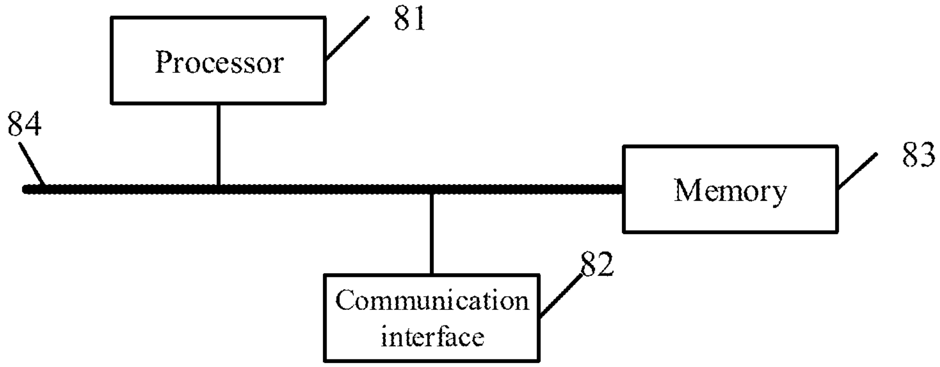
FIG. 8 is a schematic structural diagram of a CNC according to an embodiment of the present application.

FIG. 8 is a schematic structural diagram of a CNC according to an embodiment of the present application. As shown in FIG. 8, the embodiment of the present application provides a centralized network configuration network element, comprising a processor 81, a communication interface 82, a memory 83, and a communication bus 84, wherein the processor 81, the communication interface 82, and the memory 83 complete communication with each other by means of the communication bus 84,

- the memory 83 is configured to store a computer program;
- the processor 81 is configured to implement the method steps in FIG. 4 when executing a program stored in the memory 83.

The technical effects achieved by the implementation of the method steps in the processing of the centralized network configuration network element as shown in FIG. 4 are consistent with the technical effects of the method for cross-network element deterministic forwarding executed in FIG. 4 in the aforementioned embodiments, which will not be repeated herein.

The communication bus mentioned above may be a peripheral component interconnect (PCI) bus, an extended industry standard architecture (EISA) bus, or the like. The communication bus may be classified into an address bus, a data bus, a control bus, and the like. For convenience of representation, only one bold line is used for representation in FIG. 8, but it does not indicate that there is only one bus or one type of bus.

The communication interface is configured for communication between the above terminal and other devices.

The memory may comprise a random access memory (RAM) and a non-volatile memory, such as at least one disk memory. Optionally, the memory may also be at least one storage device located away from the aforementioned processor.

The processor may be a universal processor comprising a central processing unit (CPU), a network processor (NP), or the like; and may also be a digital signal processor (DSP), an application specific integrated circuit (ASIC), a field-programmable gate array (FPGA) or other programmable logic devices, discrete gate or transistor logic devices, and discrete hardware components.

The embodiments of the present application further provide a computer readable storage medium, on which a computer program is stored. When being executed by a processor, the computer program implements steps of the method for cross-network element deterministic forwarding according to any one of the foregoing method embodiments.

In another embodiment provided in the present application, a computer program product comprising instructions is further provided, which causes a computer to execute, when running on the computer, the steps of the method for cross-network element deterministic forwarding according to any one of the above embodiments.

It should be noted that in this description, relational terms such as first and second are only used to distinguish one entity or operation from another entity or operation, and do not require or imply any actual relationship or sequence between these entities or operations. Furthermore, terms such as “comprising”, “including” or any other variants are intended to cover the non-exclusive including, thereby making that the process, method, merchandise, or device comprising a series of elements comprise not only those elements but also other elements that are not listed explicitly or the inherent elements to the process, method, merchandise, or device. Without further limitation, an element defined by a sentence “comprising a . . . ” does not exclude other same elements existing in a process, a method, a commodity, or a device that comprises the element.

These above are only specific embodiments of the present invention to facilitate understanding or implementation of the present invention by those skilled in the art. Various modifications to these embodiments will be readily apparent to those skilled in the art. The general principles defined herein may be implemented in other embodiments, without departing from the spirit or scope of the present invention. Therefore, the present invention will not be limited to the embodiments described herein, but should be in accordance with the broadest scope consistent with the principle and novel features disclosed herein.

What is claimed is:

1. A method for cross-network element deterministic forwarding, performed by a centralized network configuration (CNC), comprising:

receiving first forwarding parameters reported by a time-sensitive network (TSN) application function (AF), wherein the first forwarding parameters are used for representing forwarding parameters of an N19 interface corresponding to Network Side TSN Translators (NW-TTs) of two TSN bridges bearing each TSN session, and the first forwarding parameters are acquired by the TSN AF from a capability parameter reported by one of the two NW-TTs corresponding to each TSN session;

acquiring a current TSN service flow to be forwarded, and selecting a target forwarding path from preset paths on the basis of the current TSN service flow and the first forwarding parameters, wherein the current TSN service flow is a service flow forwarded according to the N19 interface;

determining an egress port parameter and a counterpart port parameter for forwarding the current TSN service flow on the basis of the first forwarding parameters corresponding to the target forwarding path, and transmitting preset flow label information, the current TSN service flow and the port parameter to a first NW-TT corresponding to the port parameter according to a preset transmission path, wherein the preset flow label information is used for representing a unique identifier of the current TSN service flow; and controlling the first NW-TT to generate a forwarded packet in a preset format on the basis of the flow label information, the current TSN service flow and the counterpart port parameter, and performing cross-network element deterministic forwarding on the forwarded packet when the first NW-TT performs intercommunication with the N19 interface of the second NW-TT corresponding to the counterpart port parameter.

2. The method according to claim 1, wherein the first forwarding parameters are acquired by the TSN AF from a capability parameter reported by one of the two NW-TUs corresponding to each TSN session, comprising:

the TSN AF receiving Ethernet port management response information transmitted by a third NW-TT after responding to an Ethernet port management message, wherein the third NW-TT is one of two NW-TTs bearing a corresponding TSN session;

the TSN AF detecting a first parameter in the Ethernet port management response information, wherein the first parameter is used for representing whether the third NW-TT and a fourth NW-TT which is a counterpart end of the third NW-TT support deterministic forwarding of the N19 interface; and when detecting the first parameter, the TSN AF sending a forwarding parameter subscription request to the third NW-TT, and receiving the first forwarding parameters reported by the third NW-TT, wherein the first forwarding parameters at least comprise information of a user plane GTP-U tunnel of the N19 interface allocated by a corresponding user plane function (UPF) entity to bear the third NW-TT and the fourth NW-TT of the corresponding TSN session.

3. The method according to claim 2, wherein after the TSN AF sending the forwarding parameter subscription request to the third NW-TT, the method further comprises:

the third NW-TT sending the first forwarding parameters to the TSN AF after completing construction of GTP-U tunnel allocated by the corresponding UPF entity.

4. The method according to claim 2, wherein controlling the first NW-TT to generate the forwarded packet in the preset format on the basis of the flow label information, the current TSN service flow and the counterpart port parameter comprises:

the first NW-TT acquiring first GTP-U tunnel information corresponding to the N19 interface of the second NW-TT;

the first NW-TT generating a first data identifier in a preset format on the basis of the flow label information;

the first NW-TT converting the current TSN service flow into a service packet, and encapsulating the first GTP-U tunnel information and the first data identifier into an IPv6 header of the service packet to obtain the forwarded packet.

5. The method according to claim 2, wherein determining the egress port parameter and the counterpart port parameter for forwarding the current TSN service flow on the basis of the first forwarding parameters corresponding to the target forwarding path comprises:

acquiring, from the first forwarding parameters, the GTP-U tunnel information allocated by the corresponding UPF entity to the third NW-TT and the fourth NW-TT respectively;

allocating a corresponding gated time slot to the N19 interface of the third NW-TT, determining that the egress port parameter comprises the GTP-U tunnel information and the gated time slot which are allocated for the third NW-TT, and determining that the egress port parameter comprises the GTP-U tunnel information allocated for the fourth NW-TT.

6. The method according to claim 1, wherein acquiring the current TSN service flow to be forwarded, and selecting the target forwarding path from preset paths on the basis of the current TSN service flow and the first forwarding parameters, comprising:

acquiring a first preset parameter table, wherein the first preset parameter table at least comprises correlation information between a TSN service flow and a time parameter of the TSN service flow reaching each TSN network node on a preset path, a TSN network node corresponding to each preset path at least comprising two NW-TTs bearing the corresponding TSN session;

querying, in the first preset parameter table, a preset path corresponding to the current TSN service flow, so as to obtain candidate paths, and selecting, from the candidate path, a candidate path on which a time parameter of the TSN service flow reaching each TSN network node on the preset path satisfies a preset time parameter threshold;

selecting the target forwarding path from the candidate paths on the basis of the first forwarding parameters, wherein the forwarding parameters of the N19 interface corresponding to the NW-TT corresponding to the target forwarding path comprise the first forwarding parameters.

7. The method according to claim 6, wherein the time parameter comprises a first time delay and a second time delay, the first time delay is a time delay between two adjacent TSN network nodes, and the second time delay is a time delay between the NW-TTs of two TSN bridges corresponding to the TSN session, and wherein selecting, from the candidate path, a candidate path on which a time parameter for the TSN service flow to arrive at each TSN network node on the preset path satisfies a preset time parameter threshold comprises:

on the basis of the first time delay and the number of TSN nodes that each of the TSN bridges has, respectively determining a third time delay corresponding to each of the TSN bridges corresponding to each of the preset paths;

accumulating the third time delay and the second time delay corresponding to the two TSN bridges corresponding to each preset path, to obtain a corresponding total time delay of the TSN service flow reaching each TSN network node on the preset path; and determining whether the total time delay corresponding to each of the preset paths is less than a time delay threshold corresponding to the preset time parameter threshold, and determining that the candidate paths comprise the preset path on which the total time delay is less than the time delay threshold.

8. A centralized network configuration network element, comprising a processor, a communication interface, a memory and a communication bus, wherein the processor, the communication interface and the memory complete communication with each other by means of the communication bus;

the memory configured to store a computer program;

the processor configured to, when the program stored in the memory is executed, implement the steps of the method for realizing cross-network element deterministic forwarding according to claim 1.

9. A non-transitory computer readable storage medium, on which a computer program is stored, wherein the computer program is configured to, when executed by a processor, implement the steps of the method for cross-network element deterministic forwarding according to claim 1.

10. The method according to claim 1, wherein the first forwarding parameters comprising at least one of the following: GTP-U tunnel information of the N19 interface allocated for NW-TTs, or a time delay between NWTs of two TSN bridges.

11. The method according to claim 1, wherein the cross-network element deterministic forwarding comprise a deterministic forwarding across UPFs.

12. The method according to claim 1, wherein the cross-network element deterministic forwarding comprise a deterministic forwarding between two UPFs by means of the N19 interface.

13. The method according to claim 6, wherein the TSN network node comprises: a radio access network (RAN), a device side TSN translator (DS-TT), or a NW-TT.

14. The method according to claim 6, wherein the time parameter of the TSN service flow reaching each TSN network node on the preset path comprises: a time delay/gap scheduling time slot between two adjacent TSN network nodes, or and a time delay/gap scheduling time slot between NW-TTs of two TSN bridges corresponding to a TSN session.

15. The method according to claim 2, wherein the third NW-TT is a NW-TT at egress port side of TSN service flow.

16. A centralized network configuration network element, comprising a processor, a communication interface, a memory and a communication bus, wherein the processor, the communication interface and the memory complete communication with each other by means of a communication bus; the memory configured to store a computer program; the processor configured to, when the program stored in the memory is executed, implement the steps of the method for realizing cross-network element deterministic forwarding according to claim 2.

17. A centralized network configuration network element, comprising a processor, a communication interface, a memory and a communication bus, wherein the processor, the communication interface and the memory complete communication with each other by means of a communication bus; the memory configured to store a computer program; the processor configured to, when the program stored in the memory is executed, implement the steps of the method for realizing cross-network element deterministic forwarding according to claim 3.

18. A centralized network configuration network element, comprising a processor, a communication interface, a memory and a communication bus, wherein the processor, the communication interface and the memory complete communication with each other by means of a communication bus; the memory configured to store a computer program; the processor configured to, when the program stored in the memory is executed, implement the steps of the method for realizing cross-network element deterministic forwarding according to claim 4.

19. A centralized network configuration network element, comprising a processor, a communication interface, a memory and a communication bus, wherein the processor, the communication interface and the memory complete communication with each other by means of a communication bus; the memory configured to store a computer program; the processor configured to, when the program stored in the memory is executed, implement the steps of the method for realizing cross-network element deterministic forwarding according to claim 5.

20. A centralized network configuration network element, comprising a processor, a communication interface, a memory and a communication bus, wherein the processor, the communication interface and the memory complete communication with each other by means of a communication bus; the memory configured to store a computer program; the processor configured to, when the program stored in the memory is executed, implement the steps of the method for realizing cross-network element deterministic forwarding according to claim 6.

* * * * *